US012615653B2

(12) United States Patent
Umehara

(10) Patent No.: US 12,615,653 B2
(45) Date of Patent: Apr. 28, 2026

(54) COMMUNICATION DEVICE, CONTROL METHOD, AND STORAGE MEDIUM

(71) Applicant: CANON KABUSHIKI KAISHA, Tokyo (JP)

(72) Inventor: Makoto Umehara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 630 days.

(21) Appl. No.: 17/829,017

(22) Filed: May 31, 2022

(65) Prior Publication Data

US 2022/0394721 A1 Dec. 8, 2022

(30) Foreign Application Priority Data

Jun. 2, 2021 (JP) ................................. 2021-093148

(51) Int. Cl.
*H04W 72/53* (2023.01)
*H04W 72/0453* (2023.01)
*H04W 84/06* (2009.01)

(52) U.S. Cl.
CPC ....... *H04W 72/53* (2023.01); *H04W 72/0453* (2013.01); *H04W 84/06* (2013.01)

(58) Field of Classification Search
CPC . H04W 72/53; H04W 72/0453; H04W 84/06; H04W 84/12; H04W 72/1215
See application file for complete search history.

(56) References Cited

U.S. PATENT DOCUMENTS

2020/0304173 A1* 9/2020 Chu .................. H04W 72/0453
2022/0030604 A1* 1/2022 Noh .................... H04W 72/121
2022/0201769 A1* 6/2022 Li .......................... H04W 28/26
2022/0232424 A1* 7/2022 Chun ..................... H04W 28/20
2022/0239451 A1* 7/2022 Park .................. H04W 72/0453
2023/0246896 A1* 8/2023 Huang ................ H04L 27/2621
370/329
2023/0309070 A1* 9/2023 Huang .................. H04W 72/21
2023/0319732 A1* 10/2023 Ruan ..................... H04W 52/54
455/522
2023/0354098 A1* 11/2023 Ko ......................... H04L 69/323
2024/0306134 A1* 9/2024 Hu ......................... H04L 5/0094

FOREIGN PATENT DOCUMENTS

JP 2019533965 A 11/2019
WO 2017/073006 A1 5/2017

* cited by examiner

*Primary Examiner* — Yu-Wen Chang
(74) *Attorney, Agent, or Firm* — Canon U.S.A., Inc. IP Division

(57) ABSTRACT

A communication device performs, based on a frequency resource that is to be allocated to communication of a first other communication device in accordance with a first communication standard, frequency resource allocation for communication of a second other communication device that conforms to a second communication standard. In the frequency resource allocation, in a case where the first other communication device and the second other communication device concurrently communicate with the communication device, a distribution of a first frequency resource to be allocated for communication using the first communication standard and a second frequency resource to be allocated for communication using the second communication standard in an available frequency band is determined, and a frequency resource included in the second frequency resource is allocated to the second other communication device.

11 Claims, 7 Drawing Sheets

| | | |
|---|---|---|
| 201 | 202 | 203 |
| STORAGE UNIT | CONTROL UNIT | FUNCTIONAL UNIT |
| INPUT UNIT | OUTPUT UNIT | COMMUNICATION UNIT |
| 204 | 205 | 206 |

207

F I G. 3
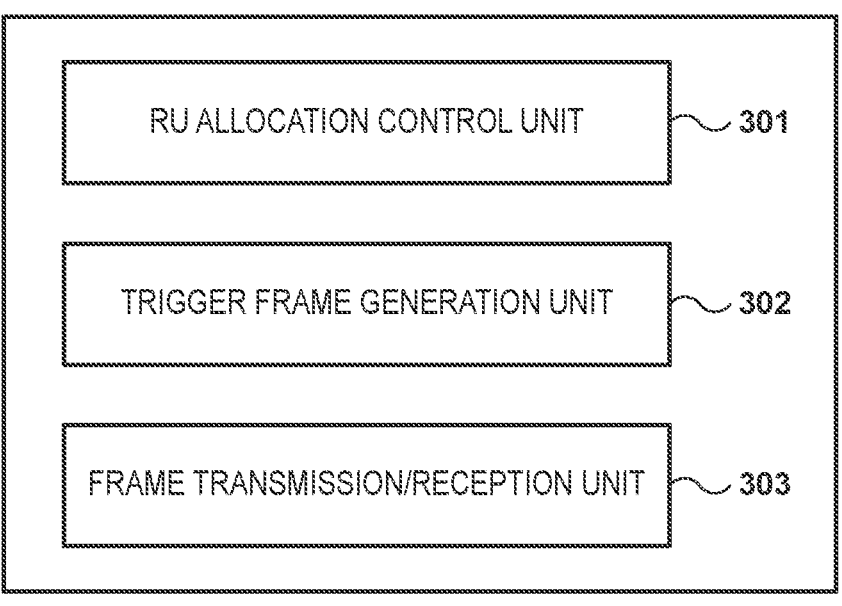

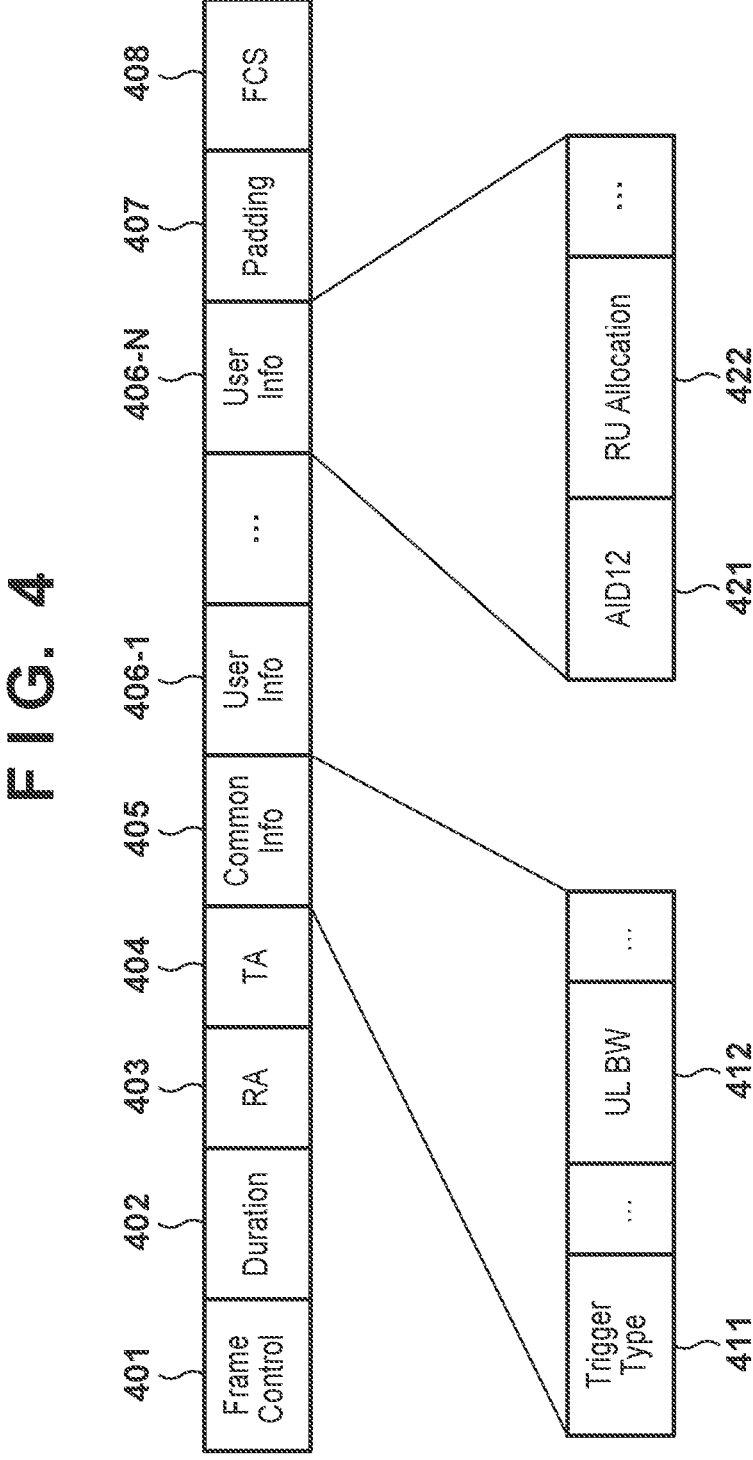
F I G. 4

F I G. 7

| RU NUMBER | HE RU SUBCARRIER NUMBER | EHT RU SUBCARRIER NUMBER | ALLOCABLE TO |
|---|---|---|---|
| 1 | [-499:-448] | [-499:-448] | HE |
| 2 | [-445:-394] | [-445:-394] | HE |
| 3 | [-365:-314] | [-365:-314] | HE |
| 4 | [-311:-260] | [-311:-260] | HE |
| 5 | [-257:-206] | [-252:-201] | EHT |
| 6 | [-203:-152] | [-198:-147] | EHT |
| 7 | [-123:-72] | [-118:-67] | EHT |
| 8 | [-69:-18] | [-64:-13] | EHT |
| 9 | [18:69] | [13:64] | EHT |
| 10 | [72:123] | [67:118] | EHT |
| 11 | [152:203] | [147:198] | EHT |
| 12 | [206:257] | [201:252] | EHT |
| 13 | [260:311] | [260:311] | HE |
| 14 | [314:365] | [314:365] | HE |
| 15 | [394:445] | [394:445] | HE |
| 16 | [448:499] | [448:499] | HE |

F I G.  8

| RU NUMBER | HE RU SUBCARRIER NUMBER | EHT RU SUBCARRIER NUMBER | ALLOCABLE TO |
|---|---|---|---|
| 1 | [-499:-448] | [-499:-448] | EHT |
| 2 | [-445:-394] | [-445:-394] | EHT |
| 3 | [-365:-314] | [-365:-314] | EHT |
| 4 | [-311:-260] | [-311:-260] | EHT |
| 5 | [-257:-206] | [-252:-201] | EHT |
| 6 | [-203:-152] | [-198:-147] | |
| 7 | [-123:-72] | [-118:-67] | HE |
| 8 | [-69:-18] | [-64:-13] | HE |
| 9 | [18:69] | [13:64] | HE |
| 10 | [72:123] | [67:118] | HE |
| 11 | [152:203] | [147:198] | |
| 12 | [206:257] | [201:252] | EHT |
| 13 | [260:311] | [260:311] | EHT |
| 14 | [314:365] | [314:365] | EHT |
| 15 | [394:445] | [394:445] | EHT |
| 16 | [448:499] | [448:499] | EHT |

COMMUNICATION DEVICE, CONTROL METHOD, AND STORAGE MEDIUM

BACKGROUND

Field

The present disclosure relates to a technique for controlling the allocation of resources in wireless communication.

Description of the Related Art

As communication standards on a wireless LAN (Wireless Local Area Network), the IEEE (Institute of Electrical and Electronics Engineers) 802.11 standards are known. The IEEE 802.11 standards are a series of standards including the IEEE 802.11a/b/g/n/ac/ax standards. International Publication No. 2017/073006 describes the IEEE 802.11ax standard in which communication is performed using OFDMA (orthogonal frequency division multiple access). The wireless communication by OFDMA can realize high peak throughput and can ensure sufficient communication speed in congested situations (see International Publication No. 2017/073006).

Currently, a new standard—the IEEE 802.11be standard—is being formulated for the IEEE 802.11 standard series in order to provide techniques for further improving throughput. In the IEEE 802.11be standard, in addition to realizing efficiency in utilization of high frequencies by using OFDMA as in IEEE 802.11ax, techniques for further improving performance are being considered.

It is anticipated that communication devices conforming to the IEEE 802.11ax standard and the IEEE 802.11be standard will be commonly used in the future. Therefore, a situation may occur in which a plurality of communication devices conforming to these standards coexist and perform communication in the same frequency band.

SUMMARY

Various embodiments of the present disclosure provide a resource allocation technique that enables efficient communication in an environment in which communication devices of a plurality of standards coexist.

According to one embodiment of the present disclosure, there is provided a communication device comprising: one or more processors; and one or more memories that store computer-readable instructions which, when executed by the one or more processors, cause the one or more processors to: based on a frequency resource that is to be allocated to communication of a first other communication device in accordance with a first communication standard, perform frequency resource allocation for communication of a second other communication device that conforms to a second communication standard, wherein in the frequency resource allocation, in a case where the first other communication device and the second other communication device concurrently communicate with the communication device, a distribution of a first frequency resource to be allocated for communication using the first communication standard and a second frequency resource to be allocated for communication using the second communication standard in an available frequency band is determined, and a frequency resource included in the second frequency resource is allocated to the second other communication device.

Further features of the present disclosure will become apparent from the following description of example embodiments with reference to the attached drawings.

BRIEF DESCRIPTION OF THE DRAWINGS

FIG. 1 is a diagram illustrating an example of a network configuration according to one embodiment.

FIG. 2 is a diagram illustrating an example of a hardware configuration of an AP according to one embodiment.

FIG. 3 is a diagram illustrating an example of a functional configuration of the AP according to one embodiment.

FIG. 4 is a diagram illustrating a configuration of a trigger frame according to one embodiment.

FIG. 7 is a diagram illustrating a first example of an RU allocation list according to one embodiment.

FIG. 8 is a diagram illustrating a second example of the RU allocation list according to one embodiment.

DESCRIPTION OF THE EMBODIMENTS

Figure 5:
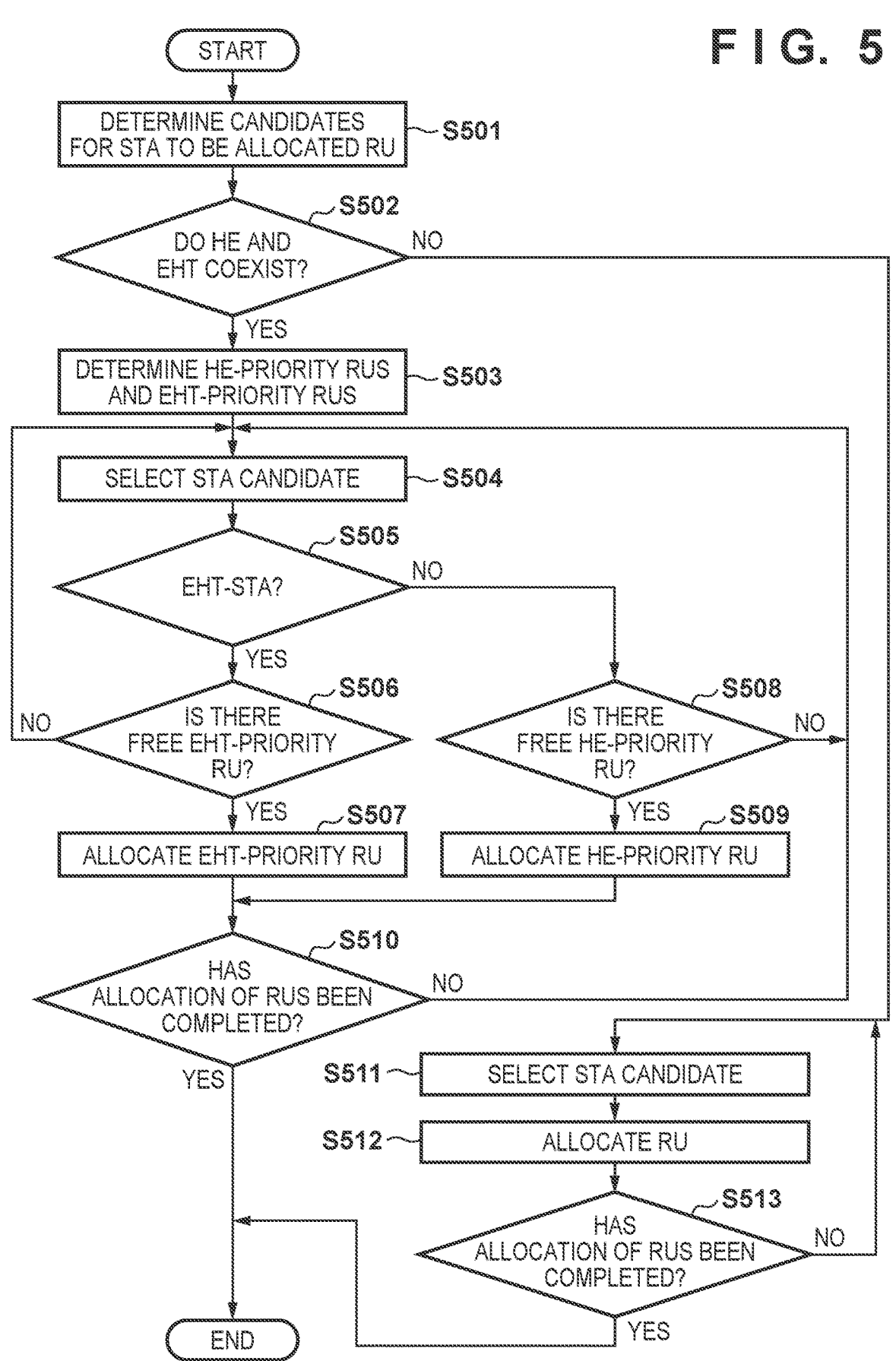
FIG. 5 is a diagram for explaining an example of a flow of processing executed by the AP according to one embodiment.

Hereinafter, embodiments will be described in detail with reference to the attached drawings. Note, the following embodiments are not intended to limit the scope of the claimed invention. Multiple features are described in the embodiments, but note that the scope of the invention is not limited to embodiments that require all such features, and multiple such features may be combined as appropriate. Furthermore, in the attached drawings, the same reference numerals are given to the same or similar configurations, and redundant description thereof is omitted.

(Network Configuration)

FIG. 1 illustrates an example of a configuration of a wireless communication network according to the present embodiment. A network 101 is a wireless communication network in which a communication device capable of executing communication conforming to the IEEE 802.11be standard and a communication device capable of executing communication conforming to the IEEE 802.11ax standard coexist. IEEE is an abbreviation for Institute of Electrical and Electronics Engineers. IEEE 802.11be can also be called IEEE 802.11 EHT. EHT is an abbreviation for Extremely High Throughput or Extreme High Throughput. IEEE 802.11ax can also be called IEEE 802.11 HE. HE is an abbreviation for High Efficiency.

In one example, the network 101 includes an AP 102 and an STA 103 conforming to the IEEE 802.11be standard and an STA 104 capable of performing communication conforming to the IEEE 802.11ax standard. AP refers to an access point, and STA refers to a station. It is assumed that the AP 102 is capable of performing communication based on the IEEE 802.11ax standard. That is, the AP 102 can communicate with the STA 103 in accordance with, for example, the wireless communication method of the IEEE 802.11be standard and communicate with the STA 104 in accordance with the wireless communication method of the IEEE 802.11ax standard. In the following, a device that executes communication conforming to the IEEE 802.11be standard is referred to as an EHT device, and a device that executes communication conforming to IEEE 802.11ax standard may be referred to as an HE device.

Each communication device can communicate in at least one frequency band of a 2.4-GHz band, a 5-GHz band, and a 6-GHz band. However, this is an example, and a different frequency band may be used, such as a 60-GHz band, for example. Also, each communication device can communicate in any signal bandwidth of 20 MHz, 40 MHz, 80 MHz, 160 MHz, and 320 MHz. A plurality of signals are multiplexed between the AP 102 and the STA 103 and the STA 104 by using OFDMA (orthogonal frequency division multiple access), and the communication of a plurality of users (STAs) is concurrently performed. The communication concurrently performed for such a plurality of users can be called multi-user (MU) communication. The AP 102 and the STA 103 may each have a plurality of antennas and may be configured to be capable of performing MIMO (Multiple-Input and Multiple-Output) communication. In such a case, a transmission-side apparatus generates a signal corresponding to each of the plurality of antennas from the plurality of data streams and transmit, from each of the plurality of antennas, a signal corresponding to each of the plurality of antennas using the same frequency channel. Then, a reception-side device concurrently receives those signals using a plurality of antennas and separates each data stream from the received signal and decodes them. By executing MIMO communication, the AP 102 and the STA 103 can transmit and receive more data in the same amount of time compared with the case where MIMO communication is not executed. The AP 102 can establish a radio link with the STA 103 or the STA 104 via connection processing such as association processing conforming to the standards of the IEEE 802.11 series.

The example of the network configuration of FIG. 1 is merely an example, and for example, a large number of EHT devices and HE devices may be included in a wider region. Further, other communication devices conforming to the legacy standards (IEEE 802.11a/b/g/n/ac standards) or the like prior to the IEEE 802.11ax standard may be included in the network. The AP 102, the STA 103, and the STA 104 may also support the legacy standards described above. In addition, the AP 102, the STA 103 and the STA 104 may support other communication standards such as Bluetooth®, NFC, UWB, Zigbee, and MBOA. UWB is an abbreviation for Ultra Wide Band, and MBOA is an abbreviation for Multi Band OFDM Alliance. Here, OFDM is an abbreviation for Orthogonal Frequency Division Multiplexing. In addition, NFC is an abbreviation for Near Field Communication. UWB includes wireless USB, wireless 1394, Winet, and the like. In addition, the AP 102, the STA 103 and the STA 104 may support a communication standard for wired communication such as a wired LAN.

The AP 102 may be a wireless LAN router, a personal computer (PC) or the like as one example but is not limited to these. That is, the AP 102 may be any communication device capable of performing communication with other communication devices using OFDMA in accordance with the IEEE 802.11be standard. The AP 102 may also be an information processing apparatus such as a radio chip that is capable of performing wireless communication conforming to the IEEE 802.11be standard. Also, the STA 103 may be, as one example, a camera, a tablet, a smart phone, a PC, a cell phone, a video camera, a headset, or the like but is not limited to these. That is, the STA 103 may be any communication device capable of performing communication with other communication devices using OFDMA in accordance with the IEEE 802.11be standard. The STA 103 may also be an information processing apparatus, such as a radio chip that is capable of performing wireless communication conforming to the IEEE 802.11be standard. The STA 104 may be any communication device that is capable of performing wireless communication conforming to the IEEE 802.11ax standard or an information processing apparatus, such as a radio chip. The information processing apparatus, such as a radio chip, has an antenna for transmitting a generated signal.

In the IEEE 802.11ax standard and the IEEE 802.11be standard, a frequency resource of a predetermined frequency bandwidth in which a predetermined number of OFDMA subcarriers are combined are provided as a Resource Unit (RU). An RU is a unit of frequency resources configured by a predetermined number of subcarriers, and frequency resources are allocated to an STA with an RU as the smallest unit. The IEEE 802.11ax standard and the IEEE 802.11be standard define a 26-tone RU, a 52-tone RU, a 106-tone RU, and the like in which 26 subcarriers, 52 subcarriers, 106 subcarriers, and the like, respectively, are combined as one RU. Further, in the IEEE 802.11ax standard and the IEEE 802.11be standard, a frequency bandwidth that can be used for communication is variably configured to be 20 MHz, 40 MHz, 80 MHz, 160 MHz, or the like. Within a frequency band that is used, an RU is associated with a serial number, and by specifying any of the serial numbers, an RU corresponding to that number is specified, and in accordance with that, a corresponding subcarrier number is specified. In a case where the frequency bandwidth to be used is 20 MHz or 40 MHz, the subcarrier numbers corresponding to each RU defined in the IEEE 802.11ax standard and the IEEE 802.11be standard are the same. Meanwhile, in other cases, it is also possible that subcarrier numbers corresponding to each RU may not coincide.

When an STA that operates in conformance with the IEEE 802.11ax standard or the IEEE 802.11be standard transmits a signal to an AP, the STA can transmit the signal to the AP in an RU that has been allocated to itself. The AP transmits a trigger frame, which will be described later, to a plurality of STAs, and the STAs transmit a signal in an allocated RU in response to receiving the trigger frame. In the IEEE 802.11ax standard and the IEEE 802.11be standard, UL-MU (UpLink Multi-User) transmission by OFDMA is performed by a plurality of STAs transmitting a signal in a different RU in accordance with a trigger frame. UpLink refers to a link in a direction in which a signal is transmitted from an STA to an AP.

A configuration of the AP 102 for efficiently allocating an RU to an STA conforming to the IEEE 802.11ax standard and an STA conforming to the IEEE 802.11be standard and a flow of processing thereof will be described in the following.

(Configuration of AP)

FIG. 2 is a diagram illustrating an example of a hardware configuration of the AP 102 according to the present embodiment. The AP 102 includes, for example, a storage unit 201, a control unit 202, a functional unit 203, an input unit 204, an output unit 205, a communication unit 206, and an antenna 207. Although the STA 103 and the STA 104 may also have the same configuration, description will be given here focusing on the AP 102.

The storage unit 201 is configured to include one or more memories, such as a ROM and a RAM, for example, and stores various kinds of information such as a computer program for performing various operations to be described later and communication parameters for wireless communication. ROM is an abbreviation of Read Only Memory, and RAM is an abbreviation of Random Access Memory. In addition to or in place of a memory, such as a ROM or a RAM, the storage unit 201 may include a storage medium such as a flexible disk, a hard disk, an optical disk, a magnetic optical disk, a CD-ROM, CD-R, a magnetic tape, a non-volatile memory card, or a DVD. The storage unit 201 may also include a plurality of memories or the like.

The control unit 202 is configured by one or more processors, such as a CPU and an MPU, for example, and controls the entire AP 102 by executing a computer program stored in the storage unit 201, for example. CPU is an abbreviation of Central Processing Unit, and MPU is an abbreviation of Micro Processing Unit. In addition to controlling the entire AP 102, the control unit 202 may be configured to perform processing for generating data or a signal (a radio frame) to be transmitted when communicating with another communication device (e.g., the STA 103). The control unit 202 may be configured to execute processing such as control of the entire AP 102 by, for example, a computer program stored in the storage unit 201 and an OS (Operating System) cooperating. Further, the control unit 202 includes a plurality of processors, such as a multi-core, and may execute processing such as overall control of the AP 102 by the plurality of processors. Further, the control unit 202 may be configured by an ASIC (Application Specific Integrated Circuit), a DSP (Digital Signal Processor), an FPGA (Field Programmable Gate Array), or the like.

Further, the control unit 202 executes predetermined processing, such as image capturing, printing, or projection by controlling the functional unit 203. The functional unit 203 is hardware for the AP 102 to perform predetermined processing. For example, if the AP 102 is a camera, the functional unit 203 is an image capturing unit and performs image capturing processing. In addition, for example, if the AP 102 is a printer, the functional unit 203 is a printing unit and performs printing processing. In addition, for example, if the AP 102 is a projector, the functional unit 203 is a projection unit and performs projection processing. The data to be processed by the functional unit 203 may be data stored in the storage unit 201 or data communicated with another communication device (e.g., the STA 103) via the communication unit 206, which will be described later.

The input unit 204 accepts various operations from the user. The output unit 205 performs various outputs to the user. Here, output by the output unit 205 includes, for example, at least one of a display on a screen, audio output by a speaker, vibration output, and the like. Both the input unit 204 and the output unit 205 may be realized by one module such as in the case of a touch panel. The input unit 204 and the output unit 205 may each be built in the AP 102 or may be configured as an external device to be connected to a communication device.

The communication unit 206 controls wireless communication conforming to the IEEE 802.11 standard series and controls IP communication. In the present embodiment, the communication unit 206 is particularly configured to control wireless communication conforming to the IEEE 802.11be standard and control, as necessary, wireless communication conforming to the IEEE 802.11ax standard. Further, the communication unit 206 may be configured to control wireless communication conforming to the legacy standards described above in the IEEE 802.11 standards. Further, the communication unit 206 may be configured to control wired communication such as a wired LAN. The communication unit 206 transmits and receives a signal for wireless communication generated by the control unit 202, for example, by controlling the antenna 207. The AP 102 may be configured to include a plurality of communication units 206. In such a case, the AP 102 can perform a multi-link communication by establishing a plurality of links, each of which is established using one communication unit 206. The AP 102 may establish a plurality of links using one communication unit 206. In such a case, the communication unit 206 can perform communication via a plurality of links by, for example, switching the operating frequency channel in a time division manner. When the AP 102 corresponds to the NFC standard, the Bluetooth standard, or the like, the communication unit 206 may also control wireless communication conforming to these communication standards. When the AP 102 is configured so as to be capable of executing wireless communication conforming to a plurality of communication standards, the communication unit 206 and the antenna 207 corresponding to each communication standard may be individually provided. Further, the AP 102 communicates data, such as image data, document data, and video data, with a communication partner device (e.g., the STA 103 or the STA 104) via the communication unit 206. The antenna 207 may be provided separately from the communication unit 206 or may be configured as one module combined with the communication unit 206.

The antenna 207 is an antenna that enables communication in a sub-GHz band, a 2.4-GHz band, a 5-GHz band, and a 6-GHz band. The AP 102 may have a multiband antenna as the antenna 207 or may have, for each frequency band, a plurality of antennas corresponding to the respective frequency bands. Further, when having a plurality of antennas 207, the AP 102 may have a plurality of communication units 206 corresponding to each of the plurality of antennas or may have a smaller number of communication units 206 than the number of antennas such as one communication unit 206 for a plurality of antennas. The antenna 207 may be a single antenna or an antenna array. That is, the antenna 207 may have a plurality of antenna elements and may be configured to be capable of performing multi-antenna communication such as MIMO, for example.

FIG. 3 illustrates an example of a functional configuration of the AP 102. The AP 102 includes, for example, an RU allocation control unit 301, a trigger frame generation unit 302, and a frame transmission/reception unit 303 as its functional configuration.

The RU allocation control unit 301 allocates an RU to the STA 103 and the STA 104 with which a radio link has been established. The trigger frame generation unit 302 generates a trigger frame that gives an opportunity for an STA to transmit a signal based on the allocation of an RU determined by the RU allocation control unit 301. The frame transmission/reception unit 303 controls the transmission and reception of a management frame which includes the trigger frame, a control frame, and a data frame. A trigger frame generated by the trigger frame generation unit 302 is transmitted to the STA 103 and the STA 104 by the frame transmission/reception unit 303. Based on the content of the trigger frame, the STA 103 and the STA 104 transmit signals in RUs that have been allocated to themselves. This allows the STA 103 and the STA 104 to transmit a signal to the AP 102 in an UL-MU transmission by OFDMA.

Here, a format of a trigger frame will be described with reference to FIG. 4. The fields/subfields illustrated here conform to the format specified in IEEE 802.11ax. That is, the trigger frame contains the respective fields of Frame Control 401, Duration 402, RA 403, TA 404, Common Info 405, User Info 406, Padding 407, and FCS 408. Among these fields, the Common Info field 405 includes information shared by a plurality of STAs for which communication is multiplexed by OFDMA. In addition, the User Info field 406 contains unique information for each of the plurality of STAs. The number of User Info fields 406 to be provided corresponds to the number of STAs. In one example, a frequency bandwidth to be used is notified to all of the target STAs by a UL BW subfield 412 in the Common Info field 405. Meanwhile, allocation information, which indicates the allocation of an RU to be used by each STA, is notified individually to each STA by an AID12 subfield 421 and an RU Allocation subfield 422 in the User Info field 406. The AID12 subfield 421 stores an AID (Association ID), which is identification information capable of uniquely specifying an STA, which has been allocated to the STA at the time of association. Thus, it becomes possible for an STA that has received this frame to specify which User Info field 406 information for itself is stored in. Then, the STA specifies the RU that has been allocated to itself by confirming the RU Allocation subfield 422 in the User Info field 406 in which its AID is stored in the AID12 subfield 421. A serial number is associated with each RU, and among those serial numbers, a number corresponding to an RU to be allocated to the STA is stored in the RU Allocation subfield 422.

(Processing Flow)

Next, an example of a flow of processing for allocating an RU to be executed by the AP 102 will be described. The processing to be described below is realized by the control unit 202 reading and executing a computer program stored in the storage unit 201 when the AP 102 determines the allocation of an RU. Dedicated hardware for executing the following process may be used, or an implementation such that a processor included in the communication unit 206, for example, executes the following process may be used.

Processing Example 1

In the present example of the processing, a case where the frequency bandwidth to be used is 20 MHz and a 52-tone RU is allocated to the STA 103 and the STA 104 will be described. If the frequency bandwidth to be used is 20 MHz, four 52-tone RUs are defined. These four RUs are called an RU 1 to an RU 4, respectively. Table 1 illustrates the subcarrier numbers corresponding to each of the RU 1 to the RU 4. In this table, [x:y] indicates a group of subcarriers between a subcarrier number x and a subcarrier number y.

TABLE 1

| RU type | RU index and subcarrier range | | | |
|---|---|---|---|---|
| 52-tone RU | RU1 | RU2 | RU3 | RU4 |
| | [−121:−70] | [−68:−17] | [17:68] | [70:121] |

In the present example of the processing, a method of allocating these four RUs will be described.

FIG. 5 illustrates an example of the flow of processing executed by the RU allocation control unit 301 of the AP 102 in the present example of the processing.

This processing is performed, for example, when the AP 102 determines the allocation of RUs or generates a trigger frame. In this processing, the AP 102 first determines candidates for an STA to be allocated an RU (step S501). For example, the AP 102 uses a BSR (Buffer Status Report) or the like to confirm the state of accumulation of transmission queues (data to be transmitted) of each STA that has established a connection with the AP 102 and determines candidates for an STA to be allocated an RU based on the result. For example, the AP 102 may select, as candidates to be allocated an RU, STAs whose amount of data to be transmitted held in a buffer exceeds a predetermined amount. The AP 102 then determines whether the candidates for an STA to be allocated an RU include both an STA that operates in accordance with the IEEE 802.11ax standard and an STA that operate in accordance with the IEEE 802.11be standard (step S502). In the following, an STA that operates in accordance with the IEEE 802.11ax standard is referred to as an HE-STA, and an STA that operates in accordance with the IEEE 802.11be standard is referred to as an EHT-STA. A network in which communication is performed in accordance with the IEEE 802.11ax standard is called an HE network, and a network in which communication is performed in accordance with the IEEE 802.11be standard is called an EHT network.

When it is determined that both an HE-STA and an EHT-STA are included in the candidates for an STA to be allocated an RU (YES in step S502), the AP 102 sets each of the four RUs indicated in Table 1 to either an HE-priority RU or an EHT-priority RU (step S503). The AP 102 determines, for example, the number of HE-priority RUs and the number of EHT-priority RUs based on the transmission band required in each of the HE network and the EHT network. For example, if the transmission band required by the HE network and the EHT network are the same, the AP 102 sets two RUs to the HE-priority RU and the other two RUs to the EHT-priority RU. Which RU to make an HE-priority RU and which RU to make an EHT-priority RU can be determined by any method.

Next, the AP 102 selects, from among the candidates for an STA to be allocated an RU, an STA to be allocated an RU (step S504). The AP 102 may, for example, select an STA preferentially from ones having a smaller corresponding AID. However, this is merely an example, and the AP 102 may, for example, allocate an RU preferentially to an STA with a higher AID. The AP 102 may allocate an RU preferentially to an STA with a smaller MAC (Media Access Control) address or an STA with a larger MAC address. In addition, the AP 102 may allocate an RU with priority to HE-STAs or EHT-STAs.

When an EHT-STA has been selected in step S504 (YES in step S505), the AP 102 determines whether there are RUs that have not yet been allocated among the EHT-priority RUs set in step S503 (step S506). Next, if there are EHT-priority RUs that have not yet been allocated (YES in step S506), the AP 102 allocates, to the STA that has been selected in step S504, an RU from the RUs that have not yet been allocated (step S507). Meanwhile, if there are no EHT-priority RUs that have not yet been allocated (NO in step S506), the AP 102 selects another STA from among the candidates for an STA to be allocated an RU without allocating an RU to the STA that has been selected in the last step S504 (step S504). In the selection of this another STA, processing such as that in which an EHT-STA is not selected (or such that an HE-STA is preferentially selected) can be performed.

When an HE-STA has been selected in step S504 (NO in step S505), the AP 102 determines whether there are RUs that have not yet been allocated among the HE-priority RUs set in step S503 (step S508). Next, if there are HE-priority RUs that have not yet been allocated (YES in step S508), the AP 102 allocates, to the STA that has been selected in step S504, an RU from the RUs that have not yet been allocated (step S509). Meanwhile, if there are no HE-priority RUs that have not yet been allocated (NO in step S508), the AP 102 selects another STA from among the candidates for an STA to be allocated an RU without allocating an RU to the STA that has been selected in the last step S504 (step S504). In the selection of this another STA, processing such as that in which an HE-STA is not selected (or such that an EHT-STA is preferentially selected) can be performed.

Then, if the allocation of RUs has been completed for all the STA candidates determined in step S501 (i.e., if all the STA candidates have been selected in step S504) (YES in step S510), the AP 102 ends the processing. The AP 102 may determine, in step S501, a number of STA candidates that are greater than or equal to the number of RUs and, when all of the RUs have been allocated to one of the STAs, end the processing. That is, the AP 102 determines, in step S510, whether a state in which no more RUs can be allocated has been entered. Then, when it is determined that no more RUs can be allocated (YES in step S510), the AP 102 ends the processing, and when RUs can still be allocated (NO in step S510), the AP 102 returns the processing to step S504.

When it is determined that only either HE-STAs or EHT-STAs are included in the candidates for an STA to be allocated an RU determined in step S501 (NO in step S502), the AP 102 performs processing for allocating an RU without setting HE-priority RUs and EHT-priority RUs. That is, similarly to step S504, the AP 102 selects, from among the candidates for an STA to be allocated an RU, an STA to be allocated an RU (step S511) and allocates an RU to that STA (step S512). Then, the AP 102 determines whether a state in which no more RUs can be allocated has been entered (step S512). Then, when it is determined that no more RUs can be allocated (YES in step S512), the AP 102 ends the processing, and when RUs can still be allocated (NO in step S512), the AP 102 returns the processing to step S511.

By the above-described processing in steps S503 to S510, the AP 102 can adaptively allocate RUs in accordance with a transmission band required for each of the HE network and the EHT network in a system in which HE-STAs and EHT-STAs coexist. Also, due to the operation in steps S511 to S513, if, for example, the candidates for an STA to be allocated an RU are only HE-STAs or EHT-STAs, all of the RUs can be utilized efficiently without providing HE or EHT-priority RUs.

In the above example, the number of HE-priority RUs and the number of EHT-priority RUs are determined based on a transmission band required in each of the HE network and the EHT network; however, the present invention is not limited to this. For example, the AP 102 may determine the number of HE-priority RUs and EHT-priority RUs based on the number of HE-STAs and the number of EHT-STAs that have established a connection with the AP 102 instead of or in addition to the transmission band. That is, the AP 102 may have more RUs to be allocated for the communication standard of a larger number of STAs. The AP 102 may also determine the number of HE-priority RUs and EHT-priority RUs from the number of HE-STAs and the number of EHT-STAs among the candidates for an STA to be allocated an RU determined in step S501.

Further, in the above example, an example in which the AP 102 determines whether to use an RU as either an HE-priority RU or an EHT-priority RU by any method has been described, but the present invention is not limited to this. For example, an RU with a sufficiently high radio quality, such as an SNR (signal-to-noise ratio) or an SINR (signal-to-interference-plus-noise ratio), may be set as an EHT-priority RU. For example, it is assumed that an EHT-STA supports a modulation scheme of a higher modulation level (the number of information types or the number of bits that can be transmitted in one symbol) than an HE-STA, such as a case where an HE-STA supports 1024 QAM (Quadrature Amplitude Modulation) and an EHT-STA supports 4096 QAM. Generally, the higher the modulation level of a modulation scheme, the higher the required radio quality (such as an SNR or an SINR). Therefore, by making an RU whose radio quality is good an EHT-priority RU, it becomes possible to use a modulation scheme of a higher modulation level to communicate with higher efficiency, thereby enabling to improve frequency utilization efficiency. In such a case, the AP 102 can determine which RU is set to an EHT-priority RU by measuring the noise level of each RU. The AP 102 may also specify the radio quality that each of the EHT-STAs that are candidates to be allocated an RU obtains at each RU by receiving, from each EHT-STA, a report such as CSI (Channel State Information). The AP 102 may also specify by measuring a signal transmitted from each of the EHT-STAs that are candidates to be allocated an RU. Then, RUs capable of ensuring a sufficient radio quality in any of the EHT-STAs, may be made EHT-priority RUs. The AP 102 may also determine, as EHT-priority RUs, the RUs in the vicinity of DC subcarriers, which are less susceptible to radio quality degradation due to frequency deviations. DC means direct current and, here, means the center of the available subcarriers, i.e., the center frequency in a signal band. If there may be an STA that does not support 4096 QAM despite being an EHT-STA, the AP 102 may allocate an EHT-priority RU whose radio quality is good preferentially to an EHT-STA that has been confirmed to support 4096 QAM.

Further, in the above-described example of the processing, when it is determined in steps S506 and S508 that an EHT-priority RU or an HE-priority RU is non-allocable, the AP 102 does not allocate an RU to an STA that has been selected in step S504; however, the present invention is not limited to this. For example, the AP 102 may allocate an EHT-priority RU to an HE-STA if it is determined that the allocation of RUs has been completed for all candidate STAs in step S510 without the allocation of RUs to HE-STAs when EHT-priority RUs are remaining. By virtue of this, it becomes possible to suppress the deterioration of the frequency utilization efficiency due to EHT-priority RUs or HE-priority RUs not being used. Also, if the processing is ended due to exhaustion of allocable RUs without RUs being allocated to one of the STA candidates determined in step S501, then in the next transmission opportunity, the AP 102 may allocate RUs preferentially to the STAs not allocated an RU. For example, the AP 102 may execute the processing of FIG. 5 when the next trigger frame is transmitted and, in such a case, may preferentially select STAs previously not allocated an RU in step S504. This makes it possible to ensure fairness in the allocation of an RU to each STA.

Processing Example 2

As described above, in a case where the frequency bandwidth to be used is 20 MHz or 40 MHz, the subcarriers corresponding to each RU of the IEEE 802.11ax standard and the IEEE 802.11be standard are the same. Meanwhile, in a case where the frequency bandwidth to be used is 80 MHz, the subcarriers corresponding to each RU of the IEEE 802.11ax standard and the IEEE 802.11be standard do not coincide. Here, Table 2 illustrates the subcarrier numbers corresponding to each RU for when an 80-MHz frequency bandwidth and 52-tone RUs are used in the IEEE 802.11ax standard. In addition, Table 3 illustrates the subcarrier numbers corresponding to each RU for when an 80-MHz frequency bandwidth and 52-tone RUs are used in the IEEE 802.11be standard. In the following, an RU of the IEEE 802.11ax standard is referred to as an HE-RU, and an RU of the IEEE 802.11be standard is referred to as an EHT-RU.

TABLE 2

| RU type | RU index and subcarrier range | | | |
|---------|-----|-----|-----|-----|
| 52-tone RU | HE-RU1 | HE-RU2 | HE-RU3 | HE-RU4 |
| | [−499:−448] | [−445:−394] | [−365:−314] | [−311:−260] |
| | HE-RU5 | HE-RU6 | HE-RU7 | HE-RU8 |
| | [−257:−206] | [−203:−152] | [−123:−72] | [−69:−18] |
| | HE-RU9 | HE-RU10 | HE-RU11 | HE-RU12 |
| | [18:69] | [72:123] | [152:203] | [206:257] |
| | HE-RU13 | HE-RU14 | HE-RU15 | HE-RU16 |
| | [260:311 ] | [314:365] | [394:445] | [448:499] |

TABLE 3

| RU type | RU index and subcarrier range | | | |
|---------|-----|-----|-----|-----|
| 52-tone RU | EHT-RU1 | EHT-RU2 | EHT-RU3 | EHT-RU4 |
| | [−499:−448] | [−445:−394] | [−365:−314] | [−311:−260] |
| | EHT-RU5 | EHT-RU6 | EHT-RU7 | EHT-RU8 |
| | [−252:−201] | [−198:−147] | [−118:−67] | [−64:−13] |
| | EHT-RU9 | EHT-RU10 | EHT-RU11 | EHT-RU12 |
| | [13:64] | [67:118] | [147:198] | [201:252] |
| | EHT-RU13 | EHT-RU14 | EHT-RU15 | EHT-RU16 |
| | [260:311 ] | [314:365] | [394:445] | [448:499] |

Here, a case where the AP 102 allocates an EHT-RU 12 to the STA 103 and an HE-RU 11 to the STA 104 will be considered. In such a case, since the STA 103 operates in accordance with the IEEE 802.11be standard, it performs an UL-MU transmission using subcarriers having subcarrier numbers 201 to 252. Meanwhile, since the STA 104 operates in accordance with the IEEE 802.11ax standard, it performs an UL-MU transmission using subcarriers having subcarrier numbers 152 to 203. Consequently, both the STA 103 and the STA 104 will transmit a signal on the subcarriers with the subcarrier numbers 201 to 203. Therefore, in these subcarriers, the signal transmitted from the STA 103 and the signal transmitted from the STA 104 interfere with each other. As a result, the AP 102 fails to receive these signals, and due to retransmission or the like being performed, for example, the frequency utilization efficiency of the entire system may decrease.

Figure 6:
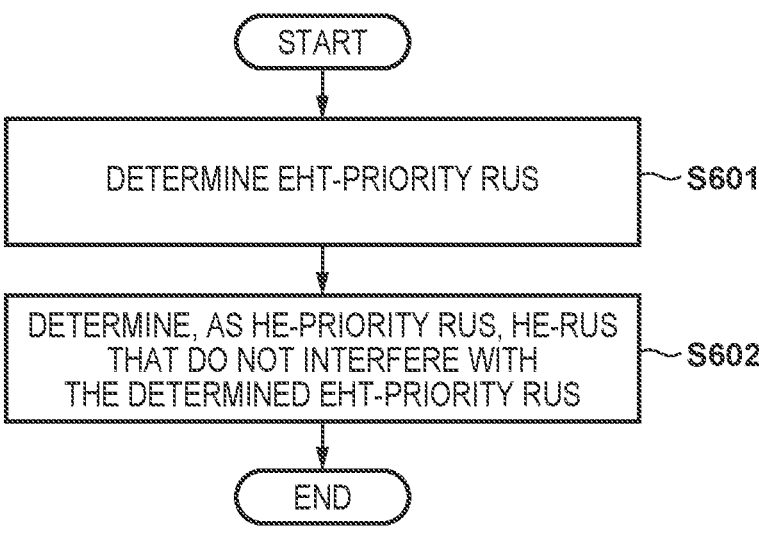
FIG. 6 is a diagram for explaining an example of the flow of processing executed by the AP according to one embodiment.

In view of such circumstances, in the present example of the processing, the frequency bandwidth to be used is 80 MHz, and the AP 102 respectively allocates a 52-tone RU to the STA 103 and the STA 104 considering the difference in the subcarriers corresponding to each RU. For this reason, in the processing of determining an HE-priority RU/EHT-priority RU in step S503 of FIG. 5, the AP 102 executes the processing such as in FIG. 6. That is, the AP 102 first determines the number of EHT-priority RUs and determines which RUs are to be EHT-priority RUs (step S601). Then, the AP 102 determines, as an HE-priority RU, an HE-RU that does not interfere with the EHT-priority RUs that have been set in step S601 (step S602).

FIGS. 7 and 8 illustrate examples for when HE-priority RUs/EHT-priority RUs have been allocated in accordance with the present example of the processing. FIG. 7 illustrates an example in which the AP 102 sets the number of EHT-priority RUs as 8 and an RU 5 to an RU 12 as EHT-priority RUs. FIG. 8 illustrates an example in which the AP 102 sets the number of EHT-priority RUs as 10 and the RU 1 to the RU 5 and the RU 12 to an RU 16 as EHT-priority RUs. In the example of FIG. 7, in step S601, the RU 5 to the RU 12 are set as EHT-priority RUs, and subcarriers with subcarrier numbers −252 to 252 corresponding to these RUs are used for communication that conforms to the IEEE 802.11be standard. Then, the AP 102 determines, as HE-priority RUs HE-RUs that do not include the subcarriers corresponding to these EHT-priority RUs. That is, here, the AP 102 determines the RU 1 to the RU 4 and the RU 13 to the RU 16 as HE-priority RUs. Meanwhile, in the example of FIG. 8, the AP 102 sets the RU 1 to the RU 5 and the RU 12 to the RU 16 as EHT-priority RUs, and subcarriers with subcarrier numbers −499 to −201 and 201 to 499 are used for communication that conforms to IEEE 802.11be standard. If the RU 6 and the RU 11 are determined to be HE-priority RUs, they may interfere with the RU 5 and the RU 12 that have been set as EHT-priority RUs in subcarriers with subcarrier numbers −203 to −201 and 201 to 203. For this reason, even though the RU 6 and the RU 11 are not EHT-priority RUs, the AP 102 does not set these as HE-priority RUs and determines only the RU 7 to the RU 10 as HE-priority RUs. With such a setting, it becomes possible to prevent the communication of EHT-STAs and the communication of HE-STAs from interfering with each other in an environment where the corresponding subcarriers of at least some EHT-RUs and HE-RUs do not coincide.

As described above, in a system in which HE-STAs and EHT-STAs coexist, it is possible to prevent interference between HE-RUs and EHT-RUs and allocate the RUs adaptively for each of the HE network and the EHT network.

The AP 102 generates and transmits to the STA 103 and the STA 104 a trigger frame containing information indicating the allocation of RUs that have been determined by the above-described processing. This makes it possible to, when the STA 103 and the STA 104 concurrently transmit a signal, instruct these STAs to use frequency resources such that the signals of these STAs do not interfere with each other.

The above-described method relates to a technique for allocating frequency resources between the IEEE 802.11ax standard and the IEEE 802.11be standard but, for example, may be applied to another standard of the IEEE 802.11 standard series. It may also be used, for example, for when allocating resources by coordination between a cellular communication standard and the IEEE 802.11 standard. For example, when performing communication of a cellular communication standard (e.g., long term evolution or fifth generation) in the frequency band of a wireless LAN, the above-described method may be applied. In one example, the frequency resources in which RUs of the communication of the IEEE 802.11ax standard or the IEEE 802.11be standard can be preferentially placed and the frequency resource in which resource blocks of the communication of a cellular communication standard can be preferentially placed can be determined. The determination may be made based on the transmission band or the like necessary for communication in each system. Then, in the frequency resources in which the communication of a wireless LAN is prioritized, RUs for the IEEE 802.11ax standard and the IEEE 802.11be standard are allocated, and in the frequency resources in which cellular communication is prioritized, the resource blocks of a cellular communication are allocated. The AP 102 may acquire, from a node of a cellular communication system, information by which a transmission band or the like required for cellular communication can be specified and determine the frequency resources that are prioritized for each of the wireless LAN and the cellular communication. The AP 102 also notifies the node of the cellular communication system of information indicating the frequency resources in which it has been determined that cellular communication is prioritized. By virtue of this, the communication of a cellular communication standard and the communication of a wireless LAN standard can be concurrently performed without interfering with each other. Further, the above-described processing may be performed with another communication standard other than the cellular communication standard. When adjusting frequency resources with a standard other than a wireless LAN such as a cellular communication standard, the AP 102 may only allocate the RUs of the wireless LAN after determining the resources that are prioritized for each system.

The AP 102 may be configured to operate only in one of the IEEE 802.11ax standard and the IEEE 802.11be standard, for example. In one example, the AP 102 may obtain, from another AP, information by which a required transmission band or the like, such as information on the amount of data to be transmitted held in an STA that is connected by the IEEE 802.11ax standard to that another AP, can be specified. Then, based on this information, the AP 102 specifies the transmission band or the like that is necessary for communication in the IEEE 802.11ax standard in another AP. Further, the AP 102 specifies, from the amount of data to be transmitted or the like held in the STA conforming to the IEEE 802.11be standard connected to the AP 102, the transmission band or the like that is necessary for communication in the IEEE 802.11be standard. The AP 102 may then determine HE-priority RUs for communication in the IEEE 802.11ax standard in another AP and EHT-priority RUs for communication in IEEE 802.11be standard in the AP 102. In such a case, the AP 102 notifies another AP of the determined HE-priority RUs and allocates an RU from the EHT-priority RUs to an EHT-STA connected to the AP 102. Thus, it is possible to cooperate and execute communication by different communication standards between a plurality of APs. Similarly, the above-described processing can be used when an AP cooperates with another AP to concurrently communicate with surrounding STAs operating in a plurality of versions of a wireless LAN communication standard.

In the above-described embodiment, description has been given for the procedure for determining the distribution of the number of RUs; however, allocable frequency resources need not be defined by a unit such as RU. That is, so long as it is a determination of a distribution of frequency resources to be respectively allocated for communication conforming to each of the plurality of communication standards in an available frequency band, the distribution may be executed without using a fixed unit of frequency resource as a standard.

Further, in the present embodiment, a configuration in which the AP 102 determines the allocation of RUs has been described, but a control device for controlling one or more APs 102 may be separately provided, and the control device may determine the allocation of RUs in the one or more APs 102.

In the embodiment described above, the process for transmitting an uplink signal to the STA 103 and the STA 104 has been described, but the same method can be applied to the allocation of RUs in downlink.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2021-093148, filed Jun. 2, 2021, which is hereby incorporated by reference herein in its entirety.

What is claimed is:

1. A communication device comprising:
one or more processors; and
one or more memories that store computer-readable instructions which, when executed by the one or more processors, cause the one or more processors to:
in a case where one or more first partner communication devices using a first communication standard and one or more second partner communication devices using a second communication standard communicate with the communication device in parallel,
determine, based on a number of the one or more first partner communication devices and a number of the one or more second partner communication devices, a distribution of a first resource unit (RU) to be allocated for communication using a first correlation table representing a correspondence between a RU index and RU subcarrier numbers in accordance with the first communication standard and a second RU to be allocated for communication using a second correlation table representing a correspondence between a RU index and RU subcarrier numbers in accordance with the second communication standard in a same frequency band, and
allocate the second RU to the one or more second partner communication devices.

2. The communication device according to claim 1,
wherein the communication device operates as a first access point (AP) that communicates with a non-AP station being compliant to the first communication standard,
wherein the communication device performs RU allocation in coordination with a second AP that communicates with a non-AP station being compliant to the second communication standard,
wherein the communication device receives, from the second AP, information of an amount of data to be transmitted held in the non-AP station communicating with the second AP, and determines a distribution of a RU for the non-AP station being compliant to the first communication standard and a RU for the non-AP station being compliant to the second communication standard within the same frequency band.

3. A control method to be executed by a communication device, the method comprising:

in a case where one or more first partner communication devices using a first communication standard and one or more second partner communication devices using a second communication standard communicate with the communication device in parallel, determining, based on a number of the one or more first partner communication devices and a number of the one or more second partner communication devices, a distribution of a first resource unit (RU) to be allocated for communication using a first correlation table representing a correspondence between a RU index and RU subcarrier numbers in accordance with the first communication standard and a second RU to be allocated for communication using a second correlation table representing a correspondence between a RU index and RU subcarrier numbers in accordance with the second communication standard in a same frequency band, and allocating, the second RU to the one or more second partner communication devices.

4. The control method according to claim 3, wherein in a frequency resource allocation, the first RU is allocated to the one or more first partner communication devices.

5. The control method according to claim 4, wherein in the frequency resource allocation, among partner communication devices that have established a connection with the communication device, one or more devices to be allocated a RU are determined, and in a case where the one or more first partner communication devices and the one or more second partner communication devices are included in the one or more devices to be allocated a RU, the distribution is determined.

6. The control method according to claim 3, wherein the communication device communicates with a second partner communication device which supports 4096 Quadrature Amplitude Modulation (QAM) and a second partner communication device which does not support 4096 QAM, and wherein, in the determining, a RU whose first radio quality is better than a second radio quality of a RU which is allocated to the second partner communication device which does not support 4096 QAM is distributed to the second partner communication device which supports 4096 QAM.

7. The control method according to claim 6, wherein the RU having the first radio quality is a RU that is closer to a center frequency in a signal band than the RU which is distributed to the second partner communication device which does not support 4096 QAM.

8. The control method according to claim 3, wherein the first communication standard is an IEEE 802.11 ax standard, and the second communication standard is an IEEE 802.11 be standard.

9. The control method according to claim 3, wherein the first communication standard is an IEEE 802.11 be standard, and the second communication standard is an IEEE 802.11 ax standard.

10. The control method according to claim 3, wherein in a frequency resource allocation, the first RU and the second RU are distributed such that a subcarrier included in the first RU and a subcarrier included in the second RU do not overlap.

11. A non-transitory computer-readable storage medium that stores a computer program for causing a computer included in a communication device to:

in a case where one or more first partner communication devices using a first communication standard and one or more second partner communication devices using a second communication standard communicate with the communication device in parallel, determine, based on a number of the one or more first partner communication devices and a number of the one or more second partner communication devices, a distribution of a first resource unit (RU) to be allocated for communication using a first correlation table representing a correspondence between a RU index and RU subcarrier numbers in accordance with the first communication standard and a second RU to be allocated for communication using a second correlation table representing a correspondence between a RU index and RU subcarrier numbers in accordance with the second communication standard in a same frequency band, and allocate the second RU to the one or more second partner communication devices.

* * * * *